United States Patent
Yanagawa

[11] 3,812,730
[45] May 28, 1974

[54] DEVICE FOR INTERMITTENTLY MOVING AN INFORMATION CARD OR THE LIKE FOR AN ADJUSTABLE PREDETERMINED DISTANCE

[75] Inventor: Nobuyuki Yanagawa, Kanagawa, Japan

[73] Assignee: Ricoh Co., Ltd., Tokyo, Japan

[22] Filed: Oct. 24, 1972

[21] Appl. No.: 300,352

[30] Foreign Application Priority Data
Oct. 27, 1971  Japan.................. 46-84647

[52] U.S. Cl. .................... 74/112, 192/23
[51] Int. Cl. ........................ F16h 27/00
[58] Field of Search .............. 74/112, 125.5; 192/28, 33, 84 P

[56] References Cited
UNITED STATES PATENTS

| | | | |
|---|---|---|---|
| 2,129,847 | 9/1938 | Knodel | 192/84 P |
| 2,251,306 | 8/1941 | Thompson | 192/84 P |
| 2,695,087 | 11/1954 | Larkin | 192/33 R |
| 2,980,326 | 4/1961 | Crooke | 74/112 |
| 3,048,246 | 8/1962 | Paige | 192/28 |
| 3,162,794 | 12/1964 | Whitaker | 74/112 |
| 3,164,233 | 1/1965 | Swanson | 192/33 R |
| 3,275,110 | 9/1966 | Lasky | 192/28 |

Primary Examiner—Samuel Scott
Assistant Examiner—Wesley S. Ratliff, Jr.
Attorney, Agent, or Firm—Cooper, Dunham, Clark, Griffin & Moran

[57] ABSTRACT

A device for moving an information card, microfiche, or the like, including a reversible drive shaft, a clutch associated therewith, solenoid-operated means for controlling the clutch to produce a predetermined angular increment of output rotation from the clutch each time the solenoid is energized, and a set of gears for transmitting drive from the clutch to an output shaft that is connectable to move an information card. The clutch comprises a toothed wheel connected to the drive shaft, a separately rotatable disk, and a pair of arms pivotally mounted on the disk for engaging the toothed wheel to drivingly connect the drive shaft to the disk. The clutch-controlling means comprises a pair of levers respectively engageable with the clutch arms, and movable by the solenoid to cause movement of the arms into and out of operation engagement with the teeth of the wheel. The transmitting gears include a first gear connected to the disk, a sun gear connected to the output shaft, and a planet gear meshing with the first gear and sun gear and mounted so as to be movable about the sun gear when the first gear is stationary to effect minor angular displacement of the output shaft for fine adjustment of the position of the information card.

14 Claims, 6 Drawing Figures

DEVICE FOR INTERMITTENTLY MOVING AN INFORMATION CARD OR THE LIKE FOR AN ADJUSTABLE PREDETERMINED DISTANCE

BACKGROUND OF THE INVENTION

This invention relates to a device for intermittently moving an information card or a projection device in a microreader for a predetermined distance. In a particular sense, the invention is directed to a device which permits fine adjustments of the relative positions of the information card and the projection device to be effected when the distance covered by the stepwise or intermittent movement of the card or projection device deviates from a desired predetermined value, so that the movement can take place accurately for the predetermined distance.

When an information card containing a large number of items of information or a microfiche film containing a large number of frames is projected to throw a picture of a desired item of information on the screen of a microreader, it is required to intermittently move the microfiche film or projection device step by step for a predetermined distance (forward or backward) and to adjust the position of the microfiche film or the projection device so as to bring the required item of information to the projected position.

To this end, it has heretofore been customary to intermittently move the microfiche or the projection device step by step for a predetermined distance to a predetermined position in accordance with signals produced by means of a keyboard for indicating the read-out position of the microfiche film.

According to the prior art, control of intermittent movements of the microfiche film or the projection device is carried out electrically by means of a device comprising a DC motor, resistors, and electromagnetic clutch and the like. The conventional control device has disadvantages in that it is high in cost, and that it involves a complex mechanism for effecting fine adjustments of the position of the moved film or projection device to correct a deviation in the position due to an error in moving the film or the projection device.

SUMMARY OF THE INVENTION

An object of the present invention is to provide a device for intermittently moving an information card and/or a projection device for a predetermined distance which obviates the aforementioned disadvantages of the prior art, and which is simple in construction and low in cost. A further object is to provide such a device which permits fine adjustments of the position to which the information card or projection device has moved to be effected readily and positively.

To these and other ends, the present invention broadly contemplates the provision of a device for intermittently moving an information card or the like, including a reversibly rotatable drive shaft; clutch means comprising a toothed wheel rotated by the drive shaft, a separately rotatable disk, and a pair of arms pivotally mounted on the disk for operatively engaging teeth of the wheel; means for controlling the clutch means; and means for transmitting motion from the clutch means. Further in accordance with the invention, the clutch-controlling means may comprise a solenoid and a pair of pivoted levers respectively associated with the clutch arms, and operable by the solenoid to cause engagement or disengagement of the arms with the gear teeth.

The arms are so arranged on the disk that when the drive shaft is rotated in one direction, one of the arms operatively is engageable with a tooth of the wheel to transmit drive from the drive shaft to the disk, while the other arm operatively engages a tooth of the wheel to similarly transmit drive when the drive shaft is rotated in the opposite direction. The arms may be resiliently biased into engagement with the wheel teeth, and the clutch-controlling levers may be arranged to engage the arms for holding them out of operative engagement with the wheel teeth, e.g. against the biasing force. The solenoid, when energized, moves the levers to release the arms so that one or the other of them (depending on the direction of drive shaft rotation) operatively engages a tooth of the wheel to transmit drive to the disk.

In addition, the levers may be so arranged that deenergization of the solenoid restores them to positions in which they engage and arrest the arms to terminate operative engagement of either arm with the wheel teeth after the disk has been turned through a predetermined angle, e.g. 180° or 360°, thereby to halt rotation of the disk. In this way, each energization of the solenoid produces a predetermined angular increment of disk rotation.

The motion-transmitting means may be arranged to transmit drive from the clutch disk to an output shaft which can be connected, e.g. through means of conventional character, to move an information card or the like in a microreader. As a particular feature of the invention, this transmitting means includes a first gear driven by the clutch disk, a sun gear connected to the output shaft, a planet gear meshing with the first gear and the sun gear, and means for supporting the planet gear. The last-mentioned supporting means holds the planet gear in axially stationary position for transmission of drive from the first gear to the sun gear, but is capable of rotary movement to effect displacement (i.e. orbital motion) of the planet gear about the sun gear when the clutch disk and first gear are not driven, the disk and first gear being then held stationary by engagement of the levers with the arms. Such displacement of the planet gear, in mesh with the stationary first gear, effects minor rotary movement of the output shaft through the sun gear for fine adjustment of position of the information card.

Thus, in summary, important objects of the invention are attained, and problems encountered in the prior art are obviated, by utilizing reversible clutch means (e.g. half-revolution reversible clutch means) and a gear system including a planet gear, for transmitting motion from a drive shaft to an output shaft.

Other and additional objects and features of the invention are pointed out in the following description in terms of the embodiments thereof which are shown in the accompanying drawings.

DETAILED DESCRIPTION

Figure 1:
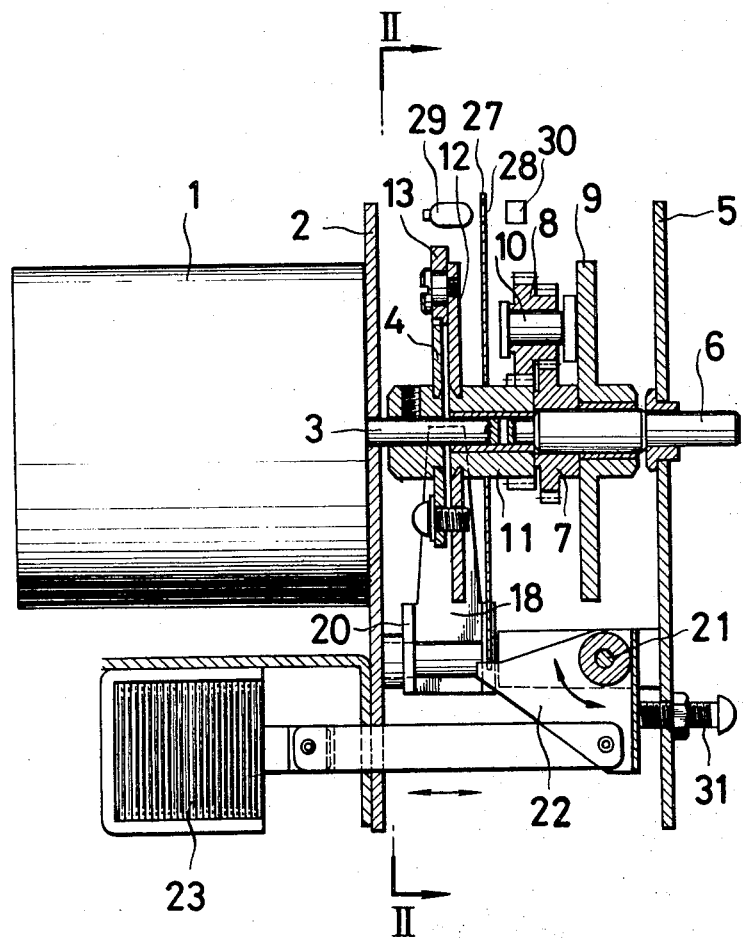
FIG. 1 is a vertical sectional side view of one embodiment of the device for intermittently moving step by step an information card or the like for an adjustable predetermined distance according to this invention.
Figure 2:
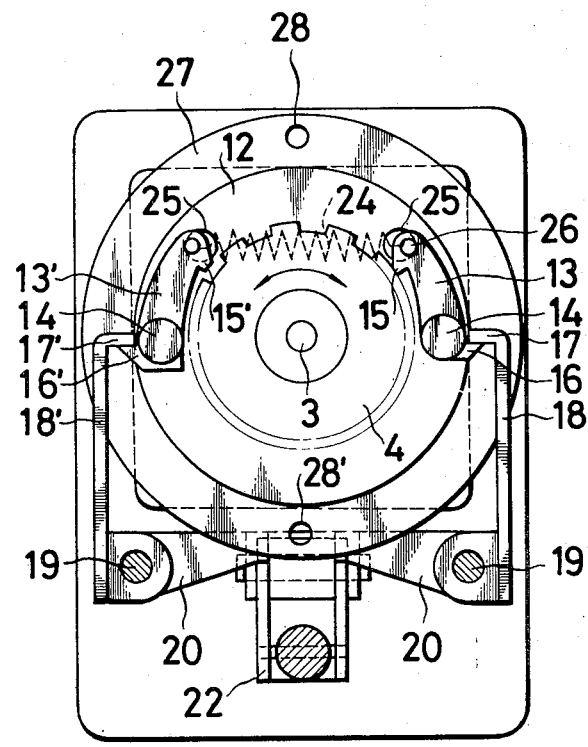
FIG. 2 is a sectional view taken along the line II—II of FIG. 1.

In FIG. 1 and FIG. 2, a reversible motor 1 is secured to a support plate 2 and a toothed wheel 4 is secured to a drive shaft 3 of the motor 2. An output shaft 6 is rotatably journalled by a bearing supported by a support plate 5 and has a sun gear 7 secured thereto and maintained in meshing engagement with a planet gear 8 which is rotatably supported by a shaft 10 mounted on a planet gear support plate 9. The planet gear 8 is further maintained in meshing engagement with a gear 11 rotatably supported by the drive shaft 3 and an output shaft 6 and has a rotary disk 12 secured thereto.

A pair of arms 13 and 13' are each pivotally supported by a shaft 14 threadably connected to the rotary disk 12. The pair of arms 13 and 13' have pawls 15 and 15' respectively at their forward ends which are maintained in engagement with teeth of the toothed wheel 4, and stop portions 16 and 16' respectively at their rearward ends. Each stop portion has a stop surface and an inclined back surface. The arms 13 and 13' are supported by the shafts 14 and 14 respectively which are disposed symmetrically with respect to the center of the toothed wheel 4, so that the arms 13 and 13' are in mirror image relationship to each other.

A spring 24 is mounted between the forward end portion of the arms 13 and 13', for resiliently biassing the pawls 15 and 15' into pressing engagement with the teeth of the toothed wheel 4, i.e. for maintaining the pawls in operative engagement with the wheel teeth. Each tooth of the toothed wheel 4 has a flank which is shaped such that it can be brought into engagement with either of the symmetrically disposed two pawls 15 and 15'.

Levers 18 and 18' having detents or stoppers 17 and 17' respectively are supported for pivotal motion about shafts 19 and 19 respectively and are adapted to be brought into engagement with the stoppers of the arms 13 and 13' respectively. The arms 13 and 13' are so constructed that when the stop portions 16 and 16' of the arms 13 and 13' are in engagement with the stoppers 17 and 17' respectively, the pawls 15 and 15' are held out of engagement with the teeth of the toothed wheel 4 (i.e. against the biasing force of spring 24), and when the stop portions 16 and 16' are released from engagement with the stoppers 17 and 17' respectively, the pawls 15 and 15' are brought into engagement with the teeth of the toothed wheel 4.

When the stoppers 17 and 17' are in engagement with the stop portions 16 and 16' respectively, the stoppers 17 and 17' are disposed in face-to-face relation such that a plane in which the center line extending through the middle of the thickness of the stoppers 17 and 17' lengthwise thereof is disposed corresponds to a diametrical line passing through the center of the toothed wheel 4.

The levers 18 and 18' have arms 20 and 20 respectively which are connected thereto for causing the levers to pivot about shafts 19 and 19 respectively. The arms 20 and 20 are adapted to be brought into engagement with a bifurcated arm 22 pivotally supported by a pin 21 and connected to a rod of a solenoid 23.

Figure 3:
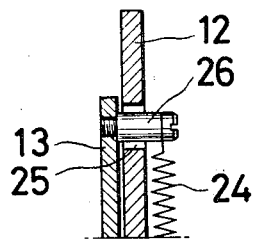
FIG. 3 is a view showing the relation between the pawl and the spring in the device of FIG. 1.

As shown in FIG. 3, the spring 24 may be conveniently connected at opposite ends thereof to pins 26, 26 connected to the arms 13 and 13' respectively and extending through openings 25 and 25 formed in the rotary disk 12, each of the openings 25 and 25 having a dimension corresponding to the range of movement of one of the arms 13 and 13'.

The gear 11 has secured to its boss a timing disk 27 which is disposed adjacent the rotary disk 12. The timing disk 27 has formed therein one opening 28 when the rotary disk 12 is adapted to make one complete revolution upon energization of the solenoid 23, and two openings 28 and 28' disposed in diametrically opposite positions when the rotary disk 12 is adapted to make one-half revolution upon energization of the solenoid 23.

A light emitter 29, such for example as a light emitting diode or a lamp, and a light receiver 30, such for example as a phototransistor, are arranged opposite to each other with respect to the timing disk 27 and disposed in positions in which the path of light emanating from the light emitter toward the light receiver is aligned with the opening or openings 28 formed in the timing disk 27. Thus, the light emanating from the light emitter 29 is incident on the light receiver 30 to produce a signal each time the opening 28 is brought into alignment with the light path. Thus, receiver 30 produces signals corresponding in number to the number of revolutions of the rotary disk 12 or the number of times of energization of the solenoid 23. By supplying these signals to a counter, it is possible to count the number of times of energization of the solenoid.

In operation, when the solenoid 23 is energized and its piston is pulled, the arms 20 and 20 of the lever 18 and 18' are pivoted upwardly, and the stoppers 17 and 17' are moved outwardly and released from engagement with the stop portions 16 and 16' respectively. Upon release of the stop portions 16 and 16' from engagement with the stoppers 17 and 17' respectively, either the pawl 15 or the pawl 15' (depending on the direction of drive shaft rotation) is brought into operative engagement with one of the teeth of the toothed wheel, by the action of the spring 24.

When, for example, the toothed wheel 4 rotates clockwise in FIG. 2 upon receipt of an instruction, the pawl 15' is brought into operative engagement with one of the teeth of the toothed wheel 4, thereby causing the rotary disk 12 to rotate clockwise together with the toothed wheel 4. The solenoid 23 is de-energized soon after the rotary disk 12 begins to rotate and the stoppers 17 and 17' are restored to their original positions in which they are again brought into engagement with the stop portions 16 and 16' respectively.

When the rotary disk 12 makes one-half revolution, the stop portion 16' of the arm 13' is engaged by the stopper 17 and the pawl 15' is released from operative engagement with the tooth of the toothed wheel 4, thereby causing the rotary disk 12 to stop rotating. Since the stop portion 16 of the arm 13 has its back surface formed as an inclined surface, it is not engaged by the stopper 17' and passes by the stopper 17' after pushing it out of the way.

Figure 4:
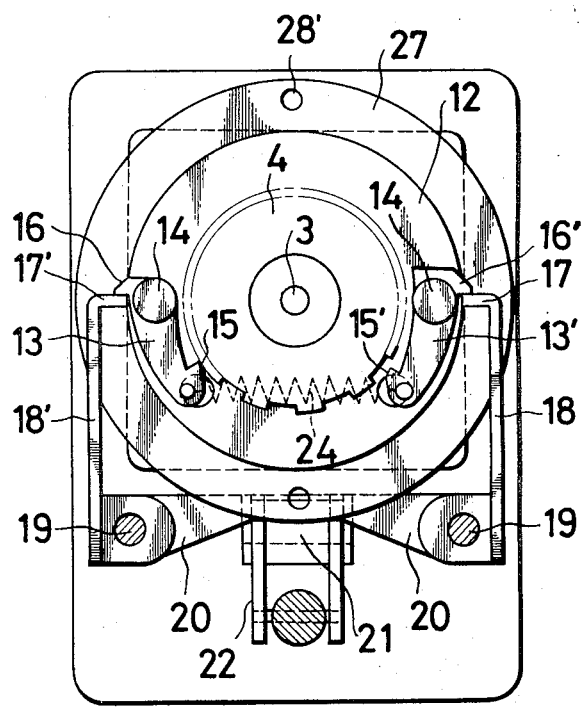
FIG. 4 is a view of the device of FIG. 1 after the solenoid is energized once.

In order that the stop portion 16 can pass by the stopper 17' without any interference, the stop portions 16 and 16' should be pivoted such that the stopper 16 passes by the stopper 17' before the stopper 16' is engaged by the stopper 17. To this end, it is desirable that the pawl 15 should be pivoted outwardly as much as possible when the pawl 15' is in engagement with one of the teeth of the toothed wheel 4. Thus, the teeth of the toothed wheel 4 are preferably shaped such that, when the pawl 15' is in operative engagement with one of them, the pawl 15 is positioned against the outer peripheral surface of one of the teeth. When the rotary disk 12 stops after making one-half revolution, it is disposed in the position shown in FIG. 4.

When the toothed wheel 4 rotates counter-clockwise upon receipt of an instruction, the arms 13 and 13' operate in a manner which is the opposite of the manner described above with reference to the clock-wise rotation of the toothed wheel 4.

One-half revolution of the rotary disk 12 is transmitted to the output shaft 6 to cause the same to rotate through a predetermined angle through a gear train consisting of the gear 11, planet gear 8 and sun gear 7 whose members of teeth are at a predetermined ratio. The angular rotation of the output shaft 6 is transmitted through known means (not shown) to an information card or a projection device to move the same a predetermined distance.

Signals produced to give instructions may vary depending on whether the direction of movement of the information card or the projection device is in the positive direction (+) or the negative direction (−), so that the motor 1 can be rotated either clockwise or counter-clockwise.

The movement of the information card or the projection device caused by one-half revolution of the rotary disk 12 may not cover a predetermined distance due to an error in the operation of the transmission system or the like. In order to compensate for the error, fine adjustments of the relative positions of the information card and the projection device are effected through the planet gear means.

In a normal operation to move the information card or the projection device, the support plate 9 is fixed or stationary and rotation of the gear 11 is transmitted to the sun gear 7 through the planet gear 8 whose axial position is fixed. When it is necessary to perform fine adjustments after completion of the normal operation to move the information card or the projection device, the support plate 9 is angularly rotated to effect orbital motion of planet gear 8 about sun gear 7. Since the gear 11 is fixed at this time (being held by the engagement of stoppers 17 and 17' with stop portions 16 and 16'), angular rotation of the support plate 9 results in the planet gear 8 rotating about the gear 11, so that the sun gear 7 is rotated through a very small angle which is determined by the rotation of the planet gear 8 on its own axis and around the output shaft 6. This permits fine adjustments of the relative positions of the information card and the projection device to be effected.

The direction of rotation of the output shaft and hence the direction of fine adjustments of the position of the information card or the projection device can be varied by rotating the support plate 9 ether clockwise or counter-clockwise. The support plate may be rotated directly manually or through a transmission system, such as a gear train (not shown).

According to this invention, the information card or the projection device can be moved a predetermined distance by a simple mechanism comprising a reversible motor, a solenoid, and half-revolution clutch means having a plurality of arms disposed at opposite ends thereof. By using a planet gear means attached to the clutch means, it is possible to effect fine adjustments of the relative positions of the information card and the projection device when one of them fails to move a predetermined distance.

An adjusting bolt 31 is connected to the support plate 5 for adjusting the amount of outward pivotal movement of the stoppers 17 and 17' and the degree of engagement of the pawls with the teeth of the toothed wheel 4 by adjusting the manner of engagement of the stop portions 16 and 16' with the stoppers 17 and 17' respectively. By adjusting the position of the adjusting bolt, it is possible to limit the position in which the bifurcated arm 22 stands by and hence to adjust the positions of the levers 18 and 18', thereby permitting adjustment of the engagement of the stoppers 17 and 17' with the stoppers 16 and 16' respectively.

Figure 5:
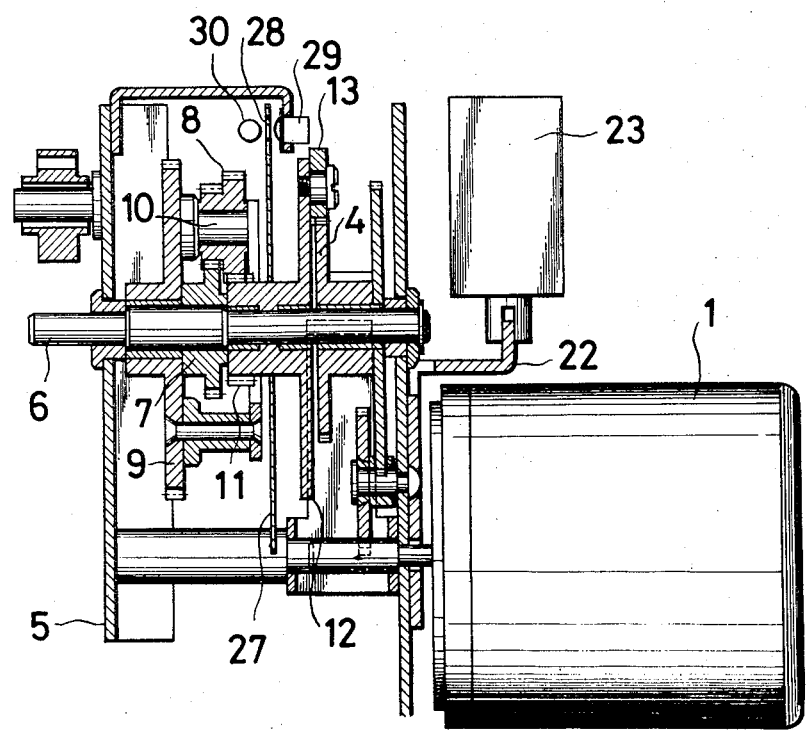
FIG. 5 is a view similar to FIG. 1 of a second embodiment.
Figure 6:
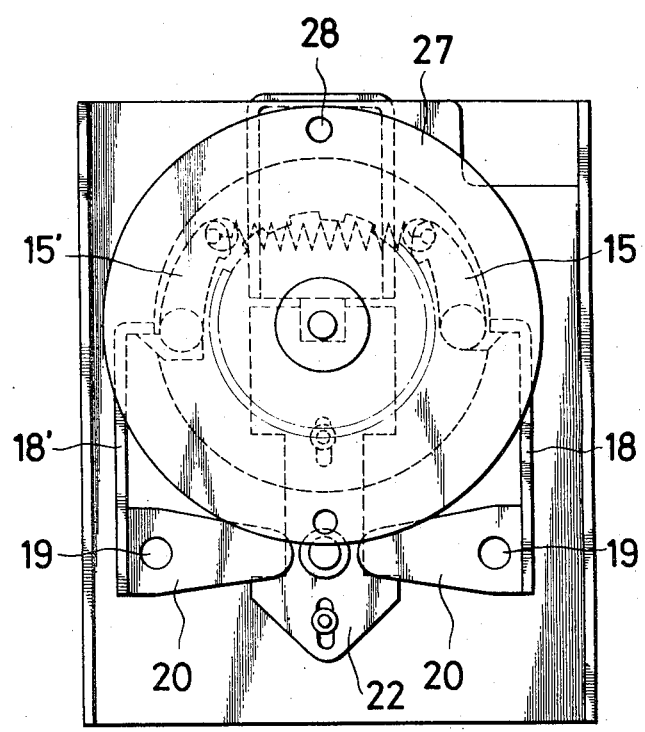
FIG. 6 is a view similar to FIG. 2 of the second embodiment.

It is to be understood that it is within the scope of the present invention to change the position of the solenoid 23, as shown in FIG. 5 and 6, or to connect the motor 1 to the drive shaft 3 through a gear train.

The invention has been described with reference to an embodiment in which the rotary disk makes one-half revolution each time the solenoid is energized. It is to be understood that the rotary disk can be made to undergo one complete revolution each time the solenoid is energized. When this is the case, the solenoid is preferably connected to an electric circuit and remains energized for a predetermined time interval when it is once energized in accordance with the time constant of the electric circuit.

The solenoid is de-energized, when the rotary disk has made more than one-half revolution, to restore the levers 18 and 18' to their engaging positions. If the motor is set such that it rotates for a predetermined interval of time after the solenoid is de-energized, the rotary disk 12 will stop rotating after making one complete revolution as the result of engagement of the stoppers 17 and 17' respectively with stop portions 16 and 16' and the motor will stop rotating with a small time lag.

According to the invention, the information card or the projection device can be moved a predetermined distance either in the normal direction or the reverse direction by varying the direction of rotation of the reversible motor and instantaneously energizing the solenoid. Also, the invention makes it possible to effect fine adjustments of the relative positions of the information card and the projection device by simply rotating the planet gear means support plate after ether the former or the latter has been moved.

It is to be understood that the invention is not limited to the features and embodiments hereinabove specifically set forth, but may be carried out in other ways without departure from its spirit.

I claim:
1. In a device for intermittently moving an information card or the like for an adjustable predetermined distance, in combination,
   a. a reversibly rotatable drive shaft;
   b. clutch means comprising:
      i. a toothed wheel secured to said drive shaft,
      ii. a rotary disk loosely mounted on said drive shaft, and iii. a pair of arms pivotally mounted on said disk for engagement with said toothed wheel and respectively operatively engageable with teeth of said wheel during rotation of said wheel in one direction and in an opposite direction, for drivably connecting said disk with said wheel;

c. means for controlling said clutch means, including i. means for continuously resiliently biasing both of said arms toward engagement with said wheel,
ii. a pair of members for respectively holding said arms out of engagement with said wheel against the force of said biasing means, said holding members being movable to release said arms for engagement with said wheel and to displace said arms out of engagement with said wheel upon rotation of said disk through a predetermined angle in either direction, and
iii. means for controlling movement of said pair of members; and d. means connected to said clutch means for transmitting motion therefrom.

2. A device as defined in claim 1, wherein said clutch-controlling means includes stationary support structure; wherein said movement-controlling means comprises a solenoid; and wherein said members comprise a pair of levers pivotally supported by said support structure for transmitting signals from said solenoid to said pair of arms.

3. A device as defined in claim 1, wherein said pair of arms are disposed symmetrically in mirror-image relationship with respect to the rotational axis of said disk.

4. A device as defined in claim 2, wherein each of said arms has a pawl engageable with a tooth of said wheel and a stop portion engageable with one of said levers, each said stop portion having an engaging surface and a back surface formed as an inclined relief surface.

5. A device as defined in claim 4, wherein said arms and levers are mutually shaped and disposed for inter-engagement at intervals of one-half revolution of said disk.

6. A device as defined in claim 5, wherein said levers and said solenoid are mutually disposed and adapted for symmetrical pivoting of said levers, by energization of said solenoid, into or out of engagement with said pair of arms.

7. A device as defined in claim 1, wherein said transmitting means comprises:

a. an output shaft;
b. a first gear connected to said clutch means;
c. a sun gear secured to and coaxial with said output shaft;
d. at least one planet gear meshing with said first gear and said sun gear; and
e. a support plate rotatably supporting said planet gear, said support plate being mounted so as to be arrestable for transmission of drive from said clutch means to said output shaft but being rotatable to rotate said output shaft through a very small angle for fine adjustment of information card position following transmission of motion from said clutch means by said transmitting means.

8. In a device for intermittently moving an information card or the like for an adjustable predetermined distance, in combination, a. a reversibly rotatable drive shaft;
b. clutch means comprising:
i. a toothed wheel rotated by said drive shaft,
ii. a separately rotatable member mounted coaxially with said toothed wheel, and
iii. a pair of arms pivotally mounted on said rotatable member, and respectively operatively engageable with teeth of said wheel during rotation of said wheel in one direction and in an opposite direction, for drivably connecting said rotatable member with said wheel;
c. means for controlling engagement of said arms with said teeth to initiate drivable connection of said rotatable member with said wheel and to terminate said drivable connection thereafter upon completion of a predetermined extent of angular displacement of said rotatable member in either direction; and
d. means for transmitting motion from said rotatable member, connectable to impart motion to an information card or the like.

9. A device as defined in claim 8, wherein said controlling means comprises:

a. means for resiliently biasing said arms into engagement with teeth of said wheel;
b. a pair of pivotally mounted levers respectively engageable with said arms at least at one predetermined angular position of said rotatable member for holding said arms out of operative engagement with said teeth; and
c. solenoid means for pivoting said levers to positions for releasing said arms for engaging said teeth, and for returning said levers to arm-engaging position for arresting and holding said arms out of operative engagement with said teeth at least upon return of said rotatable member to said one predetermined angular position.

10. A device as defined in claim 9, wherein said levers are engageable with said arms at each of two predetermined angular positions of said rotatable member.

11. A device as defined in claim 9, wherein said arms are respectively pivotally mounted on said rotatable member at opposite sides of the axis of rotation of said member; wherein said levers are respectively mounted adjacent opposite sides of the axis of rotation of said member; wherein each of said levers includes a projecting detent portion engageable with one of said arms; and wherein each of said arms includes a stop portion having a surface positively engageable with the detent portion of one of said levers when the stop portion approaches the detent portion in one direction of rotation, to stop portion having a slanted reverse surface for slidably passing the last-mentioned detent portion when the stop portion approaches the last-mentioned detent portion in an opposite direction of rotation.

12. In a device for intermittently moving an information card or the like for an adjustable predetermined distance, in combination, a. a reversibly rotatable drive shaft;
b. an output shaft connectable to impart motion to an information card or the like;
c. clutch means comprising:
i. a rotatable member, each of said drive and output shafts being separately rotatable relative thereto, and ii. means for drivably connecting said rotatable member to said drive shaft in either direction of drive shaft rotation;
d. means for controlling said connecting means to initiate drivable connection of said rotatable member with said drive shaft and to terminate said drivable connection thereafter upon completion of a predetermined extent of angular displacement of said rotatable member; and
e. means for transmitting drive from said rotatable member to said output shaft, said means being operable to produce controlled angular displacement of said output shaft in either direction following termination of said drivable connection as aforesaid; said transmitting means comprising
  i. a first gear driven by said rotatable member;
  ii. a sun gear operatively connected to said output shaft;
  iii. a planet gear meshing with said first gear and said sun gear; and
  iv. an element mounted for rotation about the axis of said output shaft for rotatably supporting said planet gear in axially stationary relation to said sun gear for transmission of drive from said first gear to said sun gear;
  v. said planet gear being carried by said element for orbital movement about said sun gear, in meshing engagement with said sun gear and said first gear, upon rotation of said element about the axis of said output shaft, thereby to effect angular displacement of said output shaft when said first gear is stationary.

13. A device as defined in claim 12, wherein said controlling means comprises means for holding said rotatable member and said first gear stationary except during drivable connection of said rotatable member with said drive shaft by said connecting means as aforesaid.

14. A device as defined in claim 12, wherein said first gear, said sun gear, and said element are mounted for rotation about a common axis, said planet gear being mounted on said element for rotation about an axis spaced laterally from said common axis, and for orbital motion about said common axis in correspondence with rotation of said element as aforesaid.

* * * * *